Sept. 26, 1939.  J. W. LEIGHTON  2,173,973
INDIVIDUAL SPRINGING
Filed July 6, 1937  2 Sheets-Sheet 1
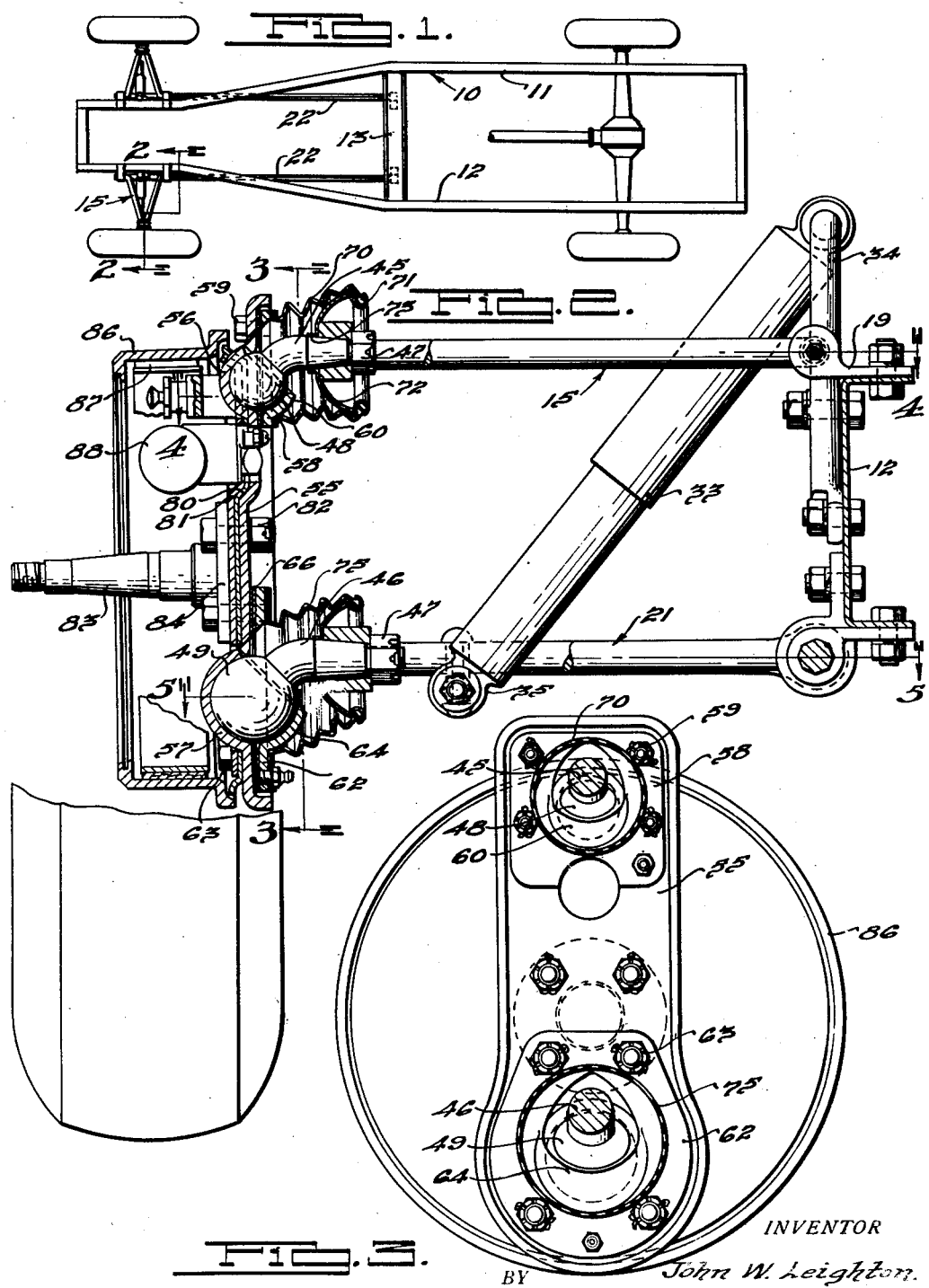

Sept. 26, 1939. J. W. LEIGHTON 2,173,973
INDIVIDUAL SPRINGING
Filed July 6, 1937 2 Sheets-Sheet 2

INVENTOR
John W. Leighton.
BY Harness, Dickey & Pierce.
ATTORNEYS.

Patented Sept. 26, 1939

2,173,973

UNITED STATES PATENT OFFICE 2,173,973

INDIVIDUAL SPRINGING

John W. Leighton, Port Huron, Mich.

Application July 6, 1937, Serial No. 152,119

7 Claims. (Cl. 280—96.2)

The invention relates generally to motor vehicles and it has particular relation to individually sprung wheel mountings.

One object of the invention is to provide an improved individual wheel springing designed to simplify manufacturing and assembling operations and to reduce the cost thereof.

Another object of the invention is to provide a simpler form of individual springing which enables elimination of parts and the manufacture of certain of the parts from sheet metal.

Another object of the invention is to provide improved means for sealing pivotal connections in an individual springing so as to prevent the ingress of dirt and the escape of lubricant.

Other objects of the invention will become apparent from the following description, the drawings to which it relates, and from the claims hereinafter set forth.

For a better understanding of the invention, reference may be had to the drawings wherein:

Fig. 1 is a plan view of a vehicle chassis illustrating wheel springing constructed according to one form of the invention;

Fig. 2 is a cross-sectional view on a large scale taken substantially along the line 2—2 of Fig. 1;

Fig. 3 is a cross-sectional view taken substantially along the line 3—3 of Fig. 2;

Referring to Fig. 1, the frame is indicated at 10 and comprises side members 11 and 12 and an intermediate cross frame member 13. The individual springing for each side of the frame is the same and therefore reference in detail to the arrangement at one side is sufficient. Certain parts of the structure illustrated are embodied and claimed in an application for patent of mine, Serial No. 152,120, filed July 6, 1937, and in so far as these parts are concerned, reference will be made to them only in general terms.

Figure 4:
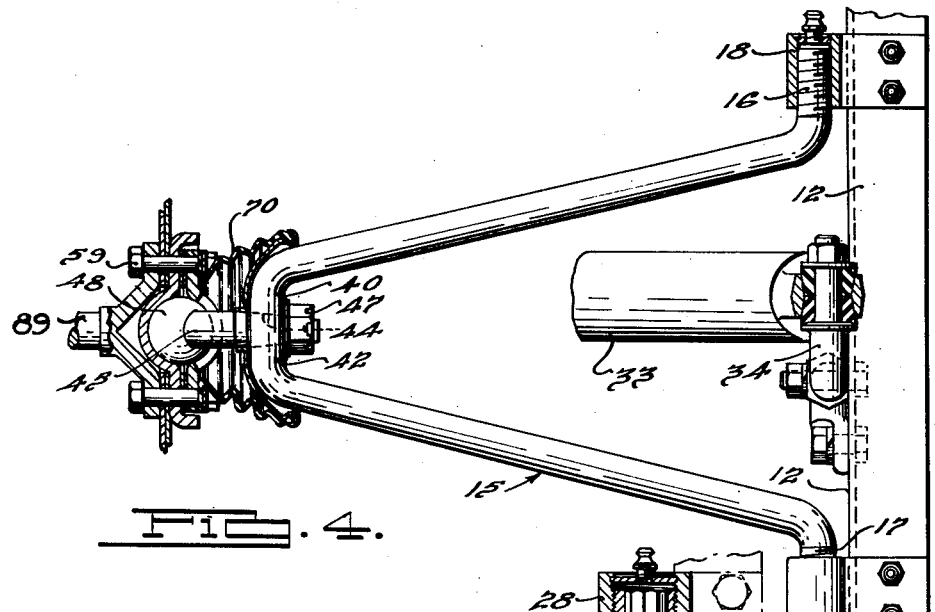
Fig. 4 is a cross-sectional view taken substantially along the line 4—4 of Fig. 2.
Figure 5:
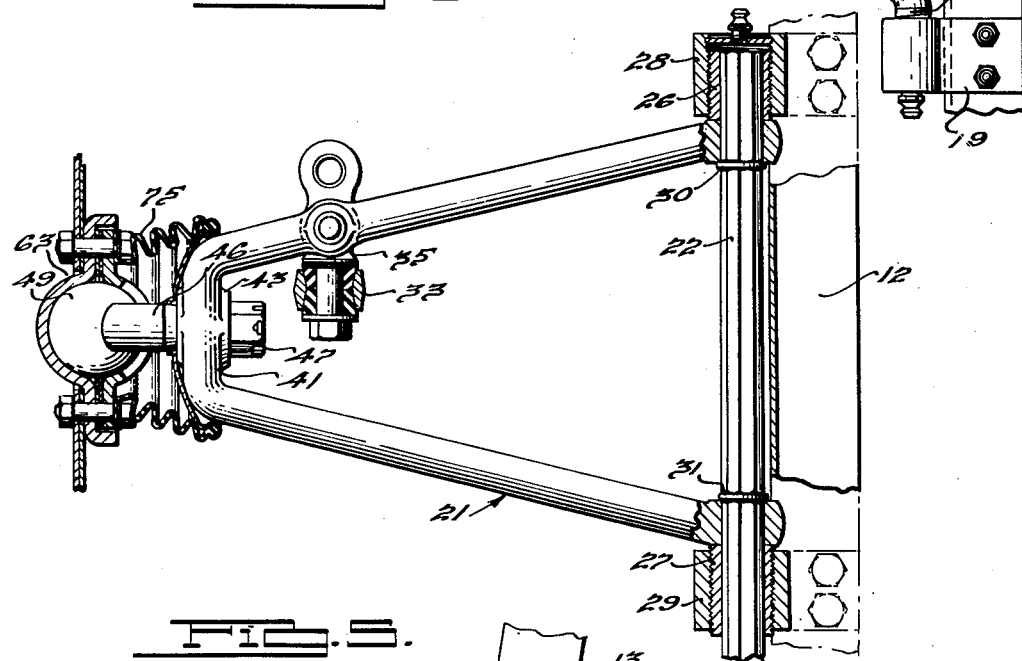
Fig. 5 is a cross-sectional view taken substantially along the line 5—5 of Fig. 2.

As shown by Figures 2, 4, and 5, the individual springing comprises an upper wishbone 15 having oppositely offset inner and threaded ends 16 and 17 that have pivotal threaded engagement with brackets 18 and 19 secured to the frame member 12. The lower wishbone is indicated at 21, and the inner ends thereof have polygonal openings receiving a polygonal torsion bar 22 that extends rearwardly and is anchored against turning in a bracket 24 on the cross-frame member 13. At its front end, the torsion bar is provided with externally threaded bushings 26 and 27 that have pivotal threaded engagement with brackets 28 and 29 secured to the frame member 12. Upset portions 30 and 31 on the torsion bar hold the wishbone and bushings in axial position, it being understood of course that the bushings turn with the torsion bar as the latter is turned torsionally by vertical movement of the wishbone.

A shock absorber 33 has one end connected to a bracket arm 34 secured to the frame member 12 and its other end secured to a second bracket member 35 on the lower wishbone 21.

As indicated above, these parts and the arrangement thereof, to which only general reference has been made, are disposed in and claimed in the copending application to which reference has been made. The present invention is concerned principally with the mounting of the wheel on the outer ends of the two wishbone members mentioned.

Now referring to Figures 4 and 5, it will be noted that the upper wishbone 15 has an integral, transverse, or apex portion 40 and that similarly the lower wishbone 21 has a portion 41. It may be mentioned that each of the wishbones may be constructed of round bar stock that is upset at its ends to provide the bearing portions or portions engaging the torsion bar, as the case may be, and that the apex portion 40 and the similar portion 41 on the two wishbones, respectively, may be enlarged by metal upsetting operations, as indicated at 42 and 43 respectively. Each of the portions 40 and 41 has a tapered opening, indicated at 44, and these openings respectively are adapted to receive ball shanks 45 and 46 that are held in the openings by means of nuts 47 threadedly engaging their inner ends. As shown best by Figure 2, the shanks 45 and 46 are turned downwardly and on their ends are provided with balls 48 and 49. It will be observed that the ball shanks, as well as the balls, are of different sizes, that is, the ball and ball shank on the upper wishbone are smaller than the ball and ball shank on the lower wishbone. It may be noted additionally that the center of the lower ball is positioned outwardly a slightly greater distance than the center of the upper ball 48 so as to properly position the axis of swinging movement of the wheels. Furthermore, the balls will be located slightly out of vertical alignment, so as to obtain a proper caster angle.

Now referring to Figures 2 and 3 particularly, the means for mounting a wheel on the outer ends of the wishbones comprises mainly a plate member 55 fashioned adjacent its upper end to provide part of a ball receiving socket, as indicated at 56, and similarly fashioned at its lower end to provide part of a ball receiving socket, as indicated at 57. A smaller plate 58 secured to the upper portion of plate 55 by means of bolts 59 is fastened as indicated at 60 to provide a part complementary to the socket portion 56, and these parts together provide the socket for the ball 48. It will be noted that the ball or shank opening for the socket has an edge located in a plane substantially normal to the downwardly turned shank portion, and this is especially desirable in conjunction with the downwardly turned shank in that greater turning of the wheel is permitted without interference between the edge of the socket opening and the shank. A lower plate 62 fastened to the plate 57 by means of bolts 63 similarly has a socket portion 64 complementary to the portion 57 so as to provide a socket for the ball 49. The opening in this socket for the shank 46 similarly is substantially normal to the downwardly bent portion of the shank. Sealing gaskets 66 are provided between the plate 55 and the plates 58 and 62 to prevent the escape of lubricant, and also prevent dirt entering the socket. For further sealing points around the ball shank where it enters the ball socket, a collapsible boot constructed of leather, rubber or the like, as indicated at 70, may be secured at one end to the plate 58 by means of the fastening bolt 59, and the other end of the boot may have a bead 71 retained by a shell 72, having a conical flange 73 seated on the tapered portion of the ball shank. A similar boot 75 may be associated with the lower ball shank. It might be mentioned that the inner end of each boot has a flange which is secured by the fastening bolts to the respective plates, and also that a metal gasket plate may hold this flange in place.

Backing plates 80 and 81 are secured to the plate 55 by means of bolts 82, and these bolts also secure an axle member 83 to these plates. For this purpose the axle terminates inwardly in a plate portion 84 through which the bolts pass. It may be mentioned that the axle is formed by upsetting metal, and that the plate portion 84 is also formed in this fashion, that is, the axle and the plate portion 84 are fashioned from metal by upsetting processes.

A brake drum indicated at 86 is provided, and it will be understood, of course, this is fastened to the wheel that is rotatably mounted on the axle 83. The brake bands indicated at 87 are anchored to the plates 55, 80 and 81 by means of a pin member 89 held by the bolts 59, and similarly the hydraulic brake operating cylinder 88 may be fastened to the plates, it being understood that openings will be provided in the plates not only for fastening the parts thereto, but also to connect fluid lines to the cylinder. It will be, of course, understood readily that the brake bands and cylinders may be fastened to the plates in different ways, although it is desirable, of course, that the interior of the brake be sealed, and it may be mentioned in this connection that the plates 80 and 81 are circular and cooperate with the brake drum to provide a closed brake housing.

The principal feature to be emphasized is the wheel mounting, which may be constructed of inexpensive sheet metal, and the provision of ball and socket connections between the wishbones and the plate. It is a relatively simple matter to manufacture the various plates, wishbones, ball and shanks therefor, wheel axle and the sealing means, and to assemble the parts. The construction of individual springing is simplified by the invention, and the expense thereof is reduced, while still preserving the high degree of efficiency in operation and providing the required durability.

Although only one form of the invention has been described and illustrated in detail, it will be apparent to those skilled in the art that various modifications may be made without departing from the scope of the appended claims.

What is claimed is:

1. The combination with a vehicle frame, upper and lower links pivoted to the frame and extending laterally therefrom, ball members on the outer ends of the links respectively, plate members secured together and fashioned to jointly provide sockets for the balls, and a wheel axle secured to the plates.

2. The combination with a vehicle frame, upper and lower links pivoted to the frame and extending laterally therefrom, each of said links at its outer end terminating in a ball shank directed at an acute angle to the vertical, a ball on the end of the shank, and wheel supporting means including spherical sockets receiving the balls, respectively, with the sockets having openings for the shanks that substantially define planes normal to the shanks.

3. The combination with a vehicle frame, upper and lower links pivoted to the frame and extending laterally therefrom, wheel mounting means at the outer ends of the links, and a ball and socket connection between each link and the mounting means, said ball and socket connections including ball supporting shanks projecting from the balls at acute angles to the vertical, and the sockets having openings substantially smaller than the ball diameter but substantially larger than the shank and which lie in planes substantially normal to the shanks.

4. The combination with a vehicle frame, wheel mounting means comprising a vertically disposed sheet metal plate having a portion fashioned to provide part of a ball socket, a wheel axle projecting laterally from the plate, means connected to the frame and including a ball engaging said socket part, and a second plate connected to the first plate and having a socket portion complementary to the first socket portion and jointly therewith providing a socket for the ball.

5. The combination with a vehicle frame, a lower wishbone, pivotally connected to the frame and comprising side members connected at their outer ends, a similar upper wishbone pivotally connected to the frame, a ball shank connected to the outer end of each wishbone, a ball on the shank, and wheel supporting means including ball sockets respectively receiving the balls.

6. The combination with a vehicle frame, wheel mounting means comprising a substantially vertical sheet metal plate located in a plane extending substantially vertically and longitudinally of the vehicle, a brake drum backing plate disposed next to and in contact with the first plate, a wheel axle extending laterally from the first plate, means securing the plates and axle member together, and linkage pivotally connecting the upper and lower portions of the first plate to the vehicle frame.

7. The combination with a vehicle frame, wheel mounting means comprising a substantially vertical sheet metal plate located in a plane extending substantially vertically and longitudinally of the vehicle, a brake drum backing plate disposed next to and in contact with the first plate, a wheel axle extending laterally from the first plate, means securing the plates and axle member together, means forming upper and lower ball sockets on the first plate and comprising ball socket depressions in such plate and separate plate elements fastened to the first plate and having socket depressions complementary to the first depressions, and linkage pivotally connected to the frame and having balls pivotally received within the sockets.

JOHN W. LEIGHTON.